(12) United States Patent
Sanuki

(10) Patent No.: US 8,902,469 B2
(45) Date of Patent: Dec. 2, 2014

(54) PRINT SETTING APPARATUS, CONTROL METHOD OF PRINT SETTING APPARATUS, COMPUTER READABLE STORAGE MEDIUM STORING CONTROL PROGRAM OF PRINT SETTING APPARATUS, AND PRINTING APPARATUS

(71) Applicant: Konica Minolta, Inc., Tokyo (JP)

(72) Inventor: Yusuke Sanuki, Tokyo (JP)

(73) Assignee: Konica Minolta, Inc. (JP)

( * ) Notice: Subject to any disclaimer, the term of this patent is extended or adjusted under 35 U.S.C. 154(b) by 0 days.

(21) Appl. No.: 13/900,476

(22) Filed: May 22, 2013

(65) Prior Publication Data

US 2013/0329238 A1 Dec. 12, 2013

(30) Foreign Application Priority Data

Jun. 11, 2012 (JP) .................................. 2012-132171

(51) Int. Cl.
*G06K 15/00* (2006.01)
*G06F 3/12* (2006.01)
*H04N 1/46* (2006.01)

(52) U.S. Cl.
CPC ............ *G06K 15/005* (2013.01); *G06F 3/1205* (2013.01); *G06F 3/1256* (2013.01); *G06F 3/1288* (2013.01)
USPC ............................. 358/1.9; 358/1.18; 358/527

(58) Field of Classification Search
USPC ........ 358/1.9, 1.15, 1.13, 1.18, 527; 715/274, 715/247, 273
See application file for complete search history.

(56) References Cited

U.S. PATENT DOCUMENTS 8,514,438 B2 * 8/2013 Nishio .......................... 358/1.15
2006/0221416 A1 10/2006 Yamada

FOREIGN PATENT DOCUMENTS

JP 2006-277605 10/2006
JP 2011-015281 1/2011

OTHER PUBLICATIONS

Notification of Reason for Refusal from JPO for appl. No. 2012-132171, dispatched Jul. 29, 2014, 3 pgs.
Translation of the Notification of Reason for Refusal from JPO for appl. No. 2012-132171, dispatched Jul. 29, 2014, 3 pgs.

* cited by examiner

*Primary Examiner* — Charlotte M Baker
(74) *Attorney, Agent, or Firm* — Squire Patton Boggs (US) LLP

(57) ABSTRACT

A print setting apparatus of the present invention displays a first preview image and a second preview image each showing output results of print data obtained by the first print setting and the second print setting, respectively (S8 and S10); receives operation instructions to the displayed first preview image (S11 and S13); and modifies the first preview image in accordance with the received operational instructions (S15) and then modifies the second preview image in accordance with the first preview image after being modified (S16).

25 Claims, 11 Drawing Sheets

PRINT SETTING APPARATUS, CONTROL METHOD OF PRINT SETTING APPARATUS, COMPUTER READABLE STORAGE MEDIUM STORING CONTROL PROGRAM OF PRINT SETTING APPARATUS, AND PRINTING APPARATUS

CROSS-REFERENCE TO RELATED APPLICATION

This application is based on Japanese Patent Application No. 2012-132171 filed on Jun. 11, 2012, the contents of which are incorporated herein by reference.

BACKGROUND

1. Technical Field

This invention relates to a print setting apparatus displaying a preview image showing an output result of print data, a control method of a print setting apparatus, a computer readable storage medium storing a control program of a print setting apparatus, and a printing apparatus.

2. Description of Related Arts

When an image based on document data is printed using a printing apparatus, a user can appropriately select various print settings on a user interface (UI) provided by a printer driver. Such print settings include double-sided printing to print images based on document data on both sides of a sheet and N-Up printing for reduction printing of images of N pages on one sheet. On the other hand, when a combination of various print settings has been selected on the UI, it may be difficult to exactly predict the finish of the output result (printed matter).

Therefore, printing apparatuses capable of displaying a preview image based on print settings selected by the user have been widely used so that the user can confirm the finish of printed matter in advance. Further, in order for the user to easily select print settings, an information processing apparatus capable of displaying, side by side, a plurality of preview images based on print settings differing from each other is proposed (in Unexamined Japanese Patent Application Publication No, 2006-277605, for example).

However, according to the technique shown in the abovementioned publication, a first preview image and a second preview image based on different print settings from each other can be displayed side by side, but the following inconvenience may occur. For example, according to the technique shown in the abovementioned publication, when the contents of the print settings largely differ from each other, it becomes difficult to intuitively understand how individual pages of document data correspond to various portions of the first and second preview images. Hereinafter, the individual pages of the document data are referred to as "logical pages."

More specifically, according to the technique shown in the abovementioned publication, when a print setting for the first preview image is double-sided printing and a print setting for the second preview image is N-Up printing, it is hardly understand able how each logical page in the first preview image corresponds to each portion of the second preview image. This makes it difficult to exactly predict the finish of printed matter. Such a problem is considered to become noticeable, especially when a combination of complex print settings is selected on the UI or when a preview image has been dynamically modified using animation technology.

This invention has been made in view of the aforementioned problems in the related art, and objects of this invention are to provide a print setting apparatus, a control method of a print setting apparatus, a computer readable storage medium storing a control program of a print setting apparatus, and a printing apparatus, which can allow a user to intuitively understand correspondence relationships between logical pages in respective preview images in displaying a plurality of preview images provided with different print settings from each other are displayed.

SUMMARY

In order to achieve at least one of the aforementioned objects, a print setting apparatus reflecting one aspect of the present invention comprises: a display unit for displaying a first preview image and a second preview image each showing output results of print data obtained by a first print setting and a second print setting; an operating unit for receiving operational instructions to the first preview image displayed by the display unit; and a modifying unit for modifying the first preview image displayed by the display unit in accordance with operational instructions received by the operating unit, and then modifying the second preview image displayed by the display unit in accordance with the first preview image after being modified.

Preferably, the print setting apparatus further includes a converting unit for converting operational instructions to the first preview image received by the operating unit in accordance with a predetermined rule, in order to generate operational instructions to the second preview image. Preferably, the modifying unit modifies the second preview image in accordance with operational instructions to the second preview image generated by the converting unit.

Preferably, the modifying unit modifies the second preview image so that a logical page of the print data contained in the first preview image after being modified will also be contained in the second preview image.

Preferably, the modifying unit modifies the second preview image when a plurality of logical pages of the print data are contained in the first preview image after being modified, so that at least one logical page with smallest page number among the plurality of logical pages will also be contained in the second preview image.

Preferably, any logical page of the print data contained in both the first preview image after being modified by the modifying unit and the second preview image are displayed in distinction from other logical pages.

Preferably, the modifying unit dynamically modifies the first review image and the second preview image in accordance with operational instructions received by the operating unit.

Preferably, operational instructions received by the operating unit are instructions regarding page turning, enlargement or reduction, or rotation of the first preview image.

Preferably, at least one of the first print setting and the second print setting includes at least one of N-Up printing, double-sided printing, bookbinding, stapling, punching, and chapter division.

The objects, features, and characteristics of the present invention other than those set forth above will become apparent from the description given below with reference to preferred embodiments illustrated in the accompanying drawings.

DETAILED DESCRIPTION

Figure 1:
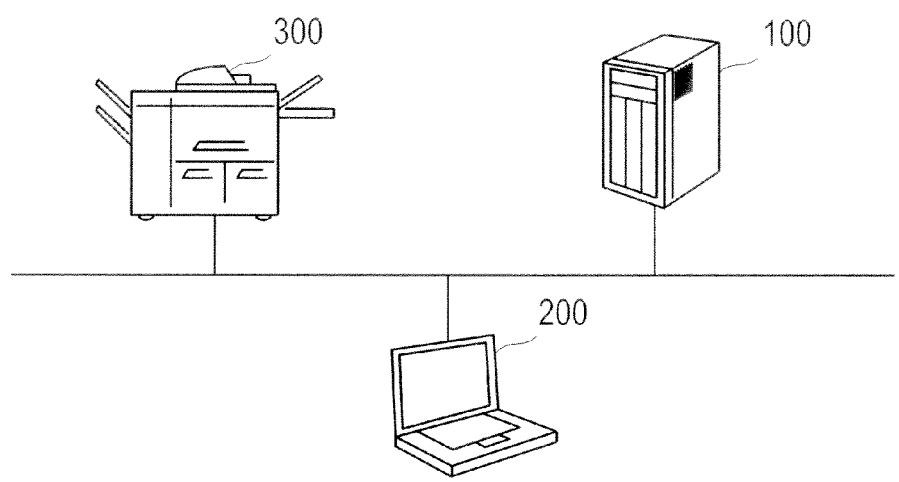
FIG. 1 is a schematic view illustrating a printing system according to an embodiment of the present invention.

The embodiments of the present invention will be described below with reference to the accompanying drawings.

Herein, in the description of the drawings, the same symbols are assigned to the same elements in order to avoid repeating descriptions. Further, sizes and scales of the elements illustrated in the drawings may be exaggerated for explanatory purpose and then may differ from actual sizes and scales. Still further, for comparison with the aforementioned "logical page," a page actually printed on each side of a sheet will be referred to as a "physical page." The schematic views of FIG. 4A to FIG. 11B illustrate, instead of preview images of physical pages actually printed, the page numbers of logical pages arranged on the physical pages.

Initially, a printing system including a print setting apparatus according to an embodiment of the present invention will be described with reference to FIG. 1 and FIG. 2. Subsequently, display control processing of a preview image executed in the print setting apparatus according to the present embodiment will be described with reference to FIG. 3A and FIG. 3B. Further, specific examples of a preview image displayed by the print setting apparatus according to the present embodiment will be described with reference to FIG. 4A to FIG. 11B.

First, the printing system according to the present embodiment will be described below with reference to FIG. 1 and FIG. 2.

As illustrated in FIG. 1, the printing system according to the present embodiment includes a Web server 100, a client terminal apparatus 200, and a printing apparatus 300. The Web server 100 is, for example, a commonly-used personal computer controlled by a predetermined operating system (OS) suitable for concurrently executing various functions, each of which requires large computer load. The Web server 100 may be used singly or a plurality thereof may be used.

The client terminal apparatus 200 is, for example, a commonly-used personal computer or a mobile terminal device, and is controlled by a predetermined operating system suitable for executing an application used by the user. The client terminal apparatus 200 may be used singly or a plurality thereof may be used. The client terminal apparatus 200 serves as a print setting apparatus according to the present embodiment.

The printing apparatus 300 is, for example, an apparatus for printing a print image based on document data or the like on a sheet in accordance with various print settings, and receives a print job transmitted from the Web server 100 via a network, in order to performs print processing based on the print job. Such a printing apparatus 300 may be used singly or a plurality thereof may be used. The printing apparatus 300 may be locally connected to the client terminal apparatus 200. In this case, the Web server 100 is not always necessitated.

Further, referring to FIG. 2, the printing system according to the present embodiment will now be described in detail. In the present embodiment, the client terminal apparatus 200 is equipped with a Web browser, and the Web server 100 is equipped with a Web application which runs on the Web browser of the client terminal apparatus 200. The user of the client terminal apparatus 200 can utilize the Web application of the Web server 100 by means of the Web browser.

Figure 2:
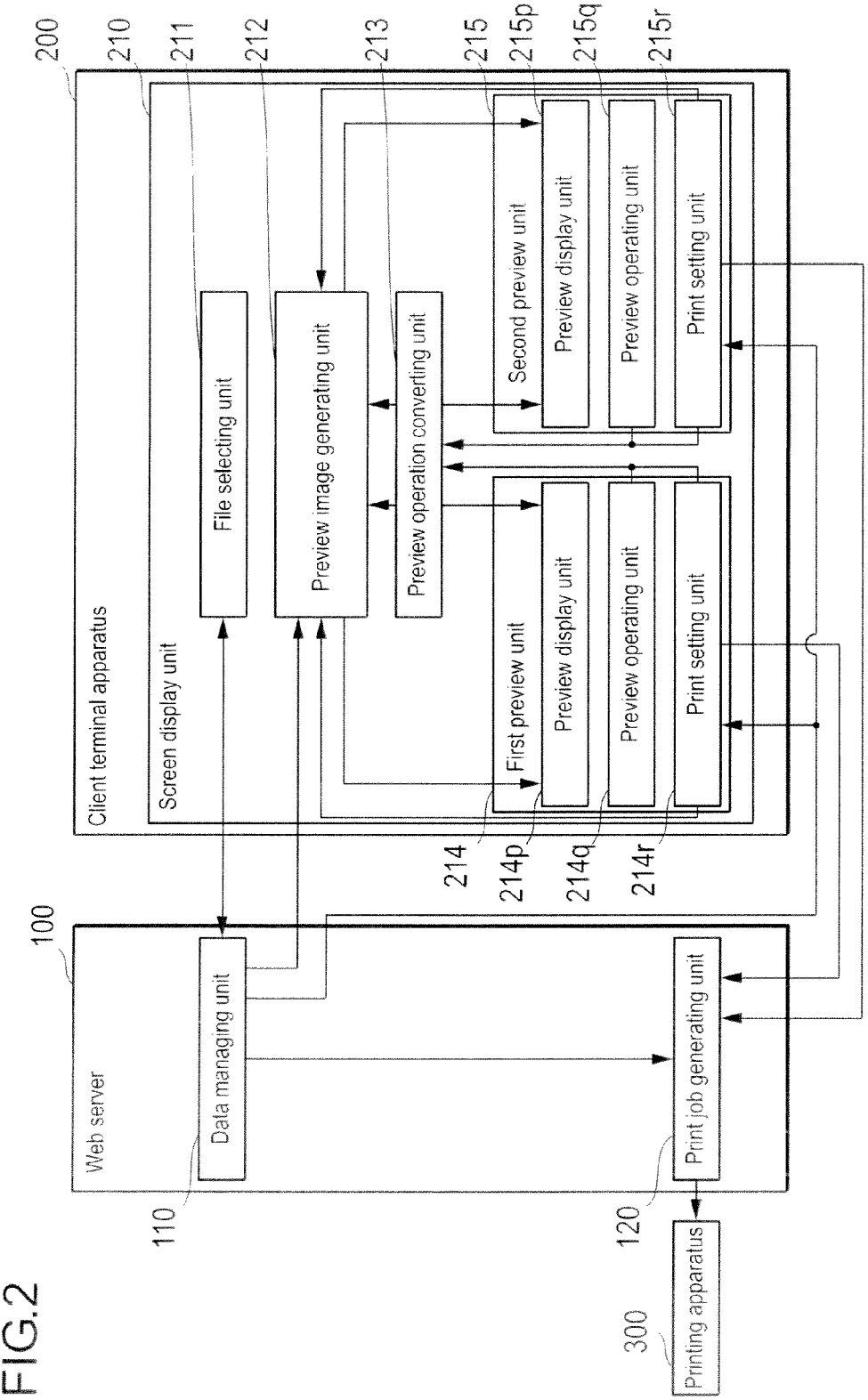
FIG. 2 is a block diagram illustrating a printing system of an embodiment of the present invention.

As illustrated in FIG. 2, the Web server 100 includes a data managing unit 110 and a print job generating unit 120. The data managing unit 110 manages various types of programs for operating the Web application, screen information for various types of UIs to be displayed on the Web browser, document data for printing uploaded from another apparatus, etc. The data managing unit 110 causes the client terminal apparatus 200 to download screen information to be managed. Further, the data managing unit 110 transmits document data to be managed to the print job generating unit 120 and a preview image generating unit 212. Then, the print job generating unit 120 generates a print job for the document data in accordance with print settings selected by the user, and transmits the print job to the printing apparatus 300.

A screen display unit 210 of the client terminal apparatus 200 configures a preview display UI and a print setting UI based on screen information downloaded from the Web server 100, and displays the UIs on the Web browser.

Herein, the print setting UI refers to a UI for receiving user instructions with respect to print settings of document data. Therefore, the user can select print settings of document data in the print setting UI. Print settings selectable in the print setting UI includes "N-Up printing," "stapling" for stapling a bundle of sheets after being printed and "punching" for punching holes in sheets after being printed as well as the aforementioned "double-sided printing."

The print setting UI can receive two suites of user instructions with respect to print settings of the same document data. In other words, the user can select a first print setting and a second print setting of the same document data in the print setting UI. User instructions received in the print setting UI are herein after referred to as "setting instructions."

Figure 4A:
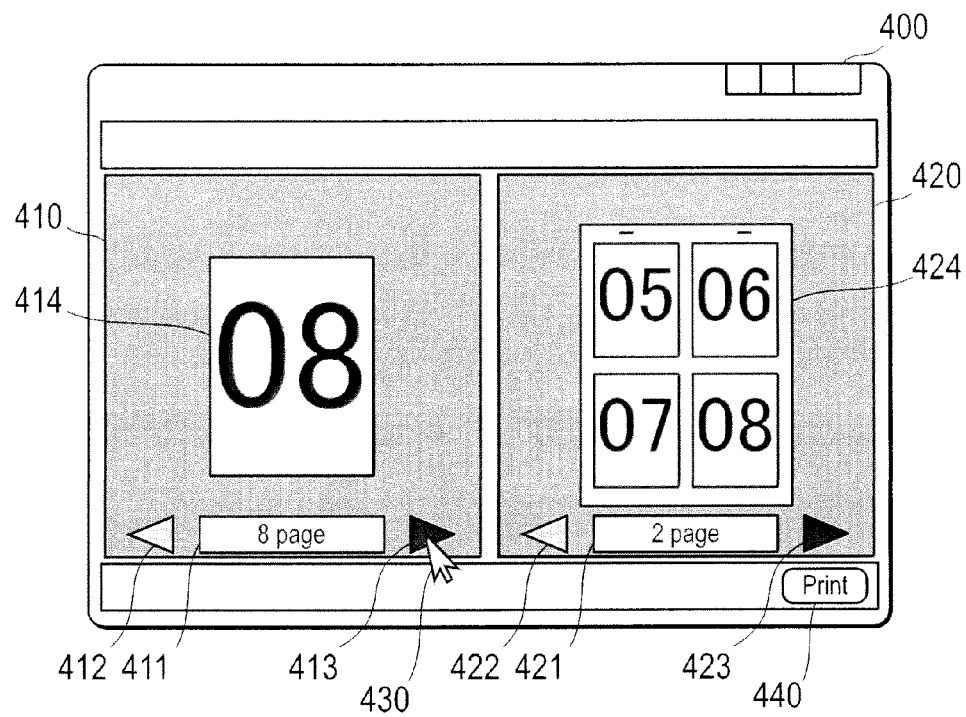
FIG. 4A is a schematic view illustrating one example of a first preview image and a second preview image according to an embodiment of the present invention.
Figure 4B:
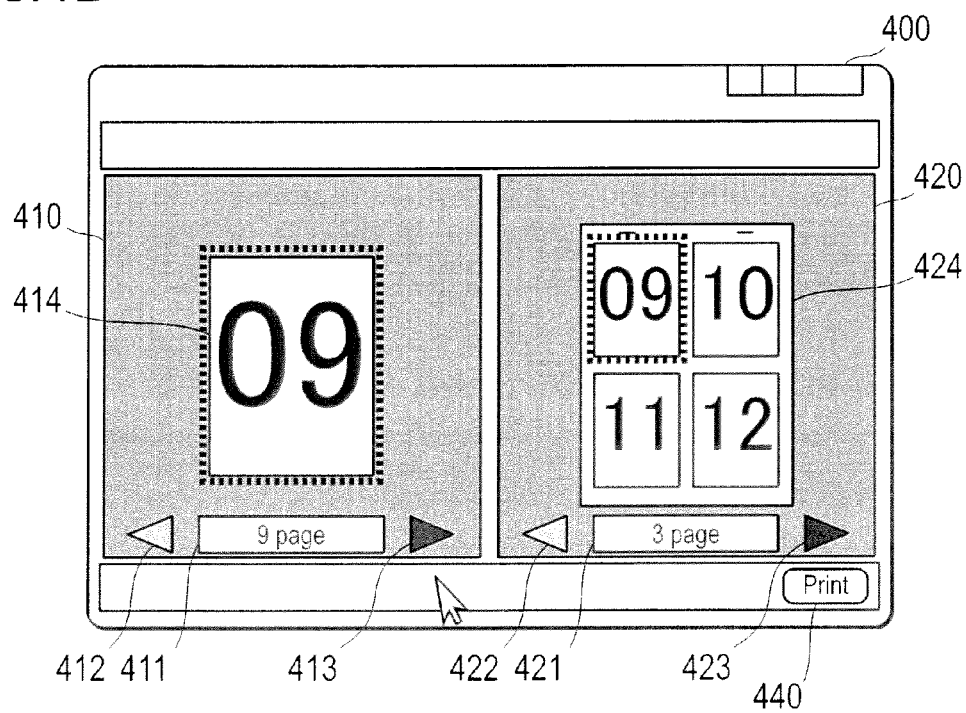
FIG. 4B is a schematic view illustrating one example of a first preview image and a second preview image according to an embodiment of the present invention.

Further, the preview display UI is a UI for displaying a preview image of document data provided with various types of print settings. In other words, the preview display UI displays, side by side, a first preview image reflecting a first print setting and a second preview image reflecting a second print setting. FIG. 4A and FIG. 4B are schematic views illustrating examples of a preview display UI 400 according to the present embodiment. As illustrated in FIGS. 4A and 4B, the preview display UI 400 includes a first preview area 410 for displaying a first preview image 414 and a second preview area 420 for displaying a second preview image 424.

Further, the first preview area 410 is provided with a page number display box 411 for indicating the page numbers of physical pages contained in the first preview image 414 being displayed; and page turning buttons 412 and 413 for page turning of the physical pages contained in the first preview image 414 being displayed. In the same manner, the second preview area 420 is provided with a page number display box 421 for indicating the page numbers of physical pages contained in the second preview image 424 being displayed; and page turning buttons 422 and 423 for page turning of the physical pages contained in the second preview image 424 being displayed.

In this manner, the preview display UI 400 can receive user instructions for modifying the display contents of the first preview image 414 by the page turning buttons 412, 413 of the first preview area 410. In the same manner, the preview display UI 400 can receive user instructions for modifying the display contents of the second preview image 424 by the page turning buttons 422, 423 of the second preview area 420. These user instructions are herein after referred to as "operational instructions."

Referring to FIG. 2 again, the screen display unit 210 of the client terminal apparatus 200 includes a file selecting unit 211, a preview image generating unit 212, a preview operation converting unit 213, a first preview unit 214, and a second preview unit 215.

The file selecting unit 211 of the screen display unit 210 displays a file selecting UI (not illustrated) on the Web browser to cause the user to select document data for preview display in this UI. The document data for preview display is selected from document data which has been uploaded on the Web server 100 to be managed by the data managing unit 110.

The preview image generating unit 212 of the screen display unit 210 generates the first preview image 414 and the second preview image 424 of the document data selected by the user. At this time, the preview image generating unit 212 simulates a printing result of the document data due to the first print setting and the second print setting, which have been selected in the print setting UI, in order to generate the first preview image 414 and the second preview image 424.

More specifically, the preview image generating unit 212 executes processes of: laying out logical pages of the previous image on each physical page in the case where double-sided printing, N-Up printing, or bookbinding has been selected; overlaying a staple or punch hole image on each physical page of the preview image in the case where stapling or punching has been selected; and converting a color image to a monochrome image in the case where monochrome printing has been selected, in order to simulate the printing result of document data.

Further, the preview image generating unit 212 modifies the display contents of the first preview image 414 or the second preview image 424 in accordance with operational instructions received in the preview display UI 400. More specifically, the preview image generating unit 212 switches physical pages of the first preview image 414, enlarges/reduces the first preview image 414, and rotates the first preview image 414, in accordance with operational instructions to the first preview image 414. In the same manner, the preview image generating unit 212 switches physical pages of the second preview image 424, enlarges/reduces the second preview image 424, and rotates the second preview image 424, in accordance with operational instructions to the second preview image 424.

Further, the preview operation converting unit 213 of the screen display unit 210 converts operational instructions to the first preview image 414 in accordance with a predetermined rule, in order to generate operational instructions to the second preview image 424. Operational instructions to the second preview image generated by the preview operation converting unit 213 are transmitted to the preview image generating unit 212. And then the preview image generating unit 212 modifies the second preview image 424 in accordance with the received operational instructions.

In other words, the preview age generating unit 212 modifies the display contents of the first preview image 414 in accordance with operational instructions received in the preview display UI 400 and modifies the display contents of the second preview image 424 in accordance with operational instructions generated by the preview operation converting unit 213. In the same manner, the preview image generating unit 212 modifies the display contents of the second preview image 424 in accordance with operational instructions received in the preview display UI 400 and modifies the display contents of the first preview image 414 in accordance with operational instructions generated by the preview operation converting unit 213.

The first preview unit 214 of the screen display unit 210 displays the first preview image 414 generated by the preview image generating unit 212 in the preview display UI 400, and also receives operational instructions to the first preview image 414 being displayed on the preview display UI 400. In the same manner, the second preview unit 215 of the screen display unit 210 displays the second preview image 424 generated by the preview image generating unit 212 in the preview display UI 400, and also receives operational instructions to the second preview image 424 being displayed on the preview display UI 400. Then, when a print executing button 440 is pushed down in the preview display UI 400, the print job generating unit 120 of the Web server 100 generates a print job of document data based on the first print setting or the second print setting.

As illustrated in FIG. 2, the first preview unit 214 includes a preview display unit 214p, a preview operating unit 214q, and a print setting unit 214r. The preview display unit 214p displays the first preview image 414 generated by the preview image generating unit 212 in the preview display UI 400. The preview operating unit 214q receives operational instructions to the first preview image 414 in the preview display UI 400. Further, the print setting unit 214r receives setting instructions of the first print setting in the print setting UI displayed on the Web browser.

In the same manner, the second preview unit 215 includes a preview display unit 215p, a preview operating unit 215q, and a print setting unit 215*r*. The preview display unit 215*p* displays the second preview image 424 generated by the preview image generating unit 212 on the preview display UI 400. The preview operating unit 215*q* receives operational instructions to the second preview image 424 on the preview display UI 400. The print setting unit 215*r* receives setting instructions of the second print setting in the print setting UI displayed on the Web browser.

Figure 3A:
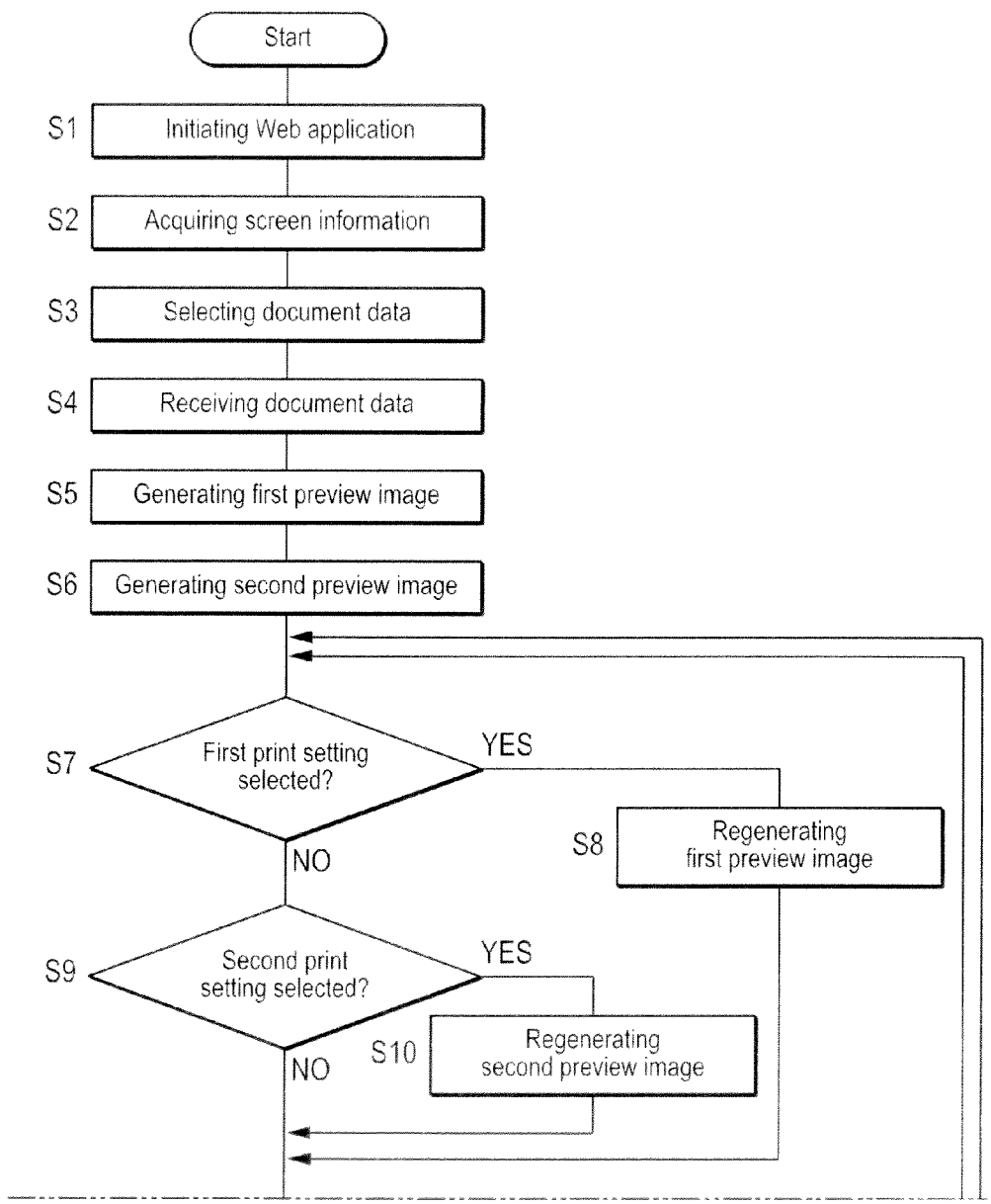
FIG. 3A is a flowchart showing steps of preview display control processing by a print setting apparatus according to an embodiment of the present invention.
Figure 3B:
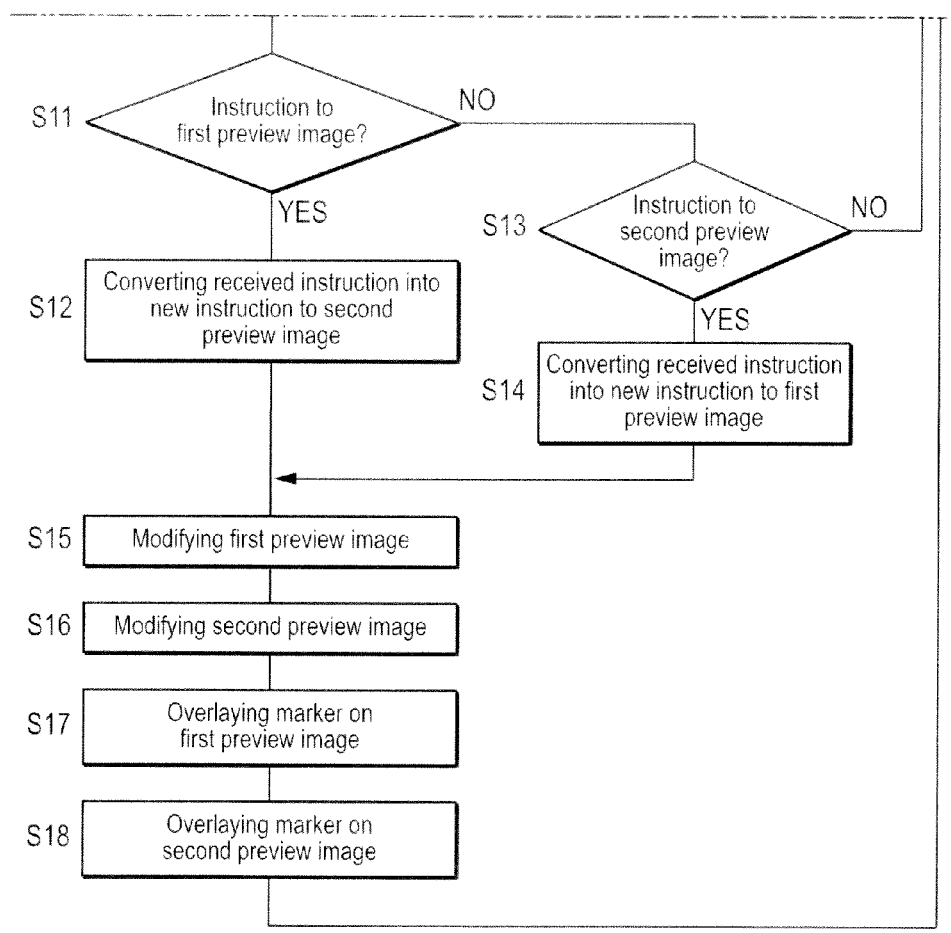
FIG. 3B is a continuation of FIG. 3A.

Next, the operation of the client terminal apparatus 200 according to the present embodiment will now be described schematically. FIG. 3A is a flowchart showing the processing steps for displaying the first preview image 414 and the second preview image 424 in the preview display UI 400 by the client terminal apparatus 200, and FIG. 3B is a continuation of FIG. 3A. Such processing is herein after referred to as "preview display control processing." The algorism represented by the flowchart of FIG. 3A and FIG. 3B is stored as a control program in a storage area of the client terminal apparatus 200.

Initially, as illustrated in FIG. 3A, the Web browser of the client terminal apparatus 200 accesses the Web server 100 to initiate a Web application on the Web server 100 (step S1). Thereby, various types of UIs including the print setting UI and the preview display UI are displayed on the Web browser of the client terminal apparatus 200. The program proceeds from step S1 to step S2 and then the preview image generating unit 212 acquires the aforementioned screen information from the data control unit 110 of the Web server 100 (step S2).

The program proceeds from step S2 to step S3 and then the file selecting unit 211 causes the user to select document data for preview display (step S3). The document data refers to document data for printing by the printing apparatus 300. The program proceeds from step S3 to step S4 and then the preview image generating unit 212 receives the document data selected by the user from the data managing unit 110 of the Web server 100 (step S4).

The program proceeds from step S4 to step S5 and then the preview image generating unit 212 generates the first preview image 214 of the document data received at step S4 based on the screen information acquired at step S2 (step S5). In step S5, a default print setting is employed as the first print setting except for the case where the user has previously selected a special print setting. The first preview image 414 generated in this manner is displayed in the first preview area 410 of the preview display UI 400 by the preview display unit 214*q* of the first preview unit 214.

The program proceeds from step S5 to step S6 and then the preview image generating unit 212 generates the second preview image 424 of the document data received at step S4 based on the screen information acquired at step S2 (step S6). In step S6, a default print setting is employed as the second print setting except for the case where the user has previously selected a special print setting. The second preview image 424 generated in this manner is displayed in the second preview area 420 of the UI 400 by the preview display unit 215*q* of the second preview unit 215.

The program proceeds from step S6 to step S7 and then it determines whether or not the user has selected the first print setting in the print setting UI (step S7). The program then proceeds to step S8 if the first print setting has been selected (step S7: YES), but it proceeds to step S9 if the first print setting has not been selected (step S7: NO).

When the program proceeds from step S7 to step S8, the preview image generating unit 212 regenerates the first preview image 414 of the document data (step S8). In step S8, the first preview image 414 reflecting the first print setting selected by the user is generated. The first preview image 414 generated in this manner is displayed in the first preview area 410 of the preview display UI 400 by the preview image unit 214*q*.

When the program proceeds from step S7 to step S9, it determines whether or not the user has selected the second print setting in the print setting UI (step S9). The program proceeds to step S10 if the second print setting has been selected (step S9: YES), but it proceeds to step S11 if the second print setting has not been selected (step S9: NO).

When the program proceeds from step 9 to step S10, the preview image generating unit 212 regenerates the second preview image 424 of the document data (step S10). In step S10, the second preview image 424 reflecting the second print setting selected by the user is generated. The second preview image 424 generated in this manner is displayed in the second preview area 420 of the preview display UI 400 by the preview image unit 215*q*.

When the program proceeds from step S9 to step S11, it determines whether or not the preview display UI 400 has received operational instructions to the first preview image 414 (step S11). The program proceeds to step S12 if operational instructions to the first preview image 414 have been received (step S11: YES), but it proceeds to step S13 if operational instructions to the first preview image 414 have not been received (step S11: NO).

When the program proceeds from step S11 to step S12, the preview operation converting unit 213 converts operational instructions received in the preview display UI 400 into new operational instructions to the second preview image 424, in accordance with the display contents of the first preview image 414 after being modified due to the operational instructions (step S12). For example, the preview operation converting unit 213 generates operational instructions to the second preview image 424 so that the logical page contained in the first preview image 414 after being modified due to the operational instructions received in the preview display UI 400 will also be contained in the second preview image 424 (See FIGS. 4A and 4B).

When the program proceeds from step S11 to step S13, it determines whether or not the preview display UI 400 has received operational instructions to the second preview image 424 is determined (step S13). Then, the program proceeds to step S14 if operational instructions to the second preview image 424 have been received (step S13: YES), but it returns to step S7 if operational instructions to the second previous image 424 have not been received (step S13: NO).

When the program proceeds from step S13 to step S14, the preview operation converting unit 213 converts operational instructions received in the preview display UI 400 into new operational instructions to the first preview image 414, in accordance with the display contents of the second preview image 424 after being modified due to the operational instructions (step S14). For example, the preview operation converting unit 213 generates operational instructions to the first preview image 414 so that the logical page contained in the second preview image 424 after being modified due to the operational instructions received in the preview display UI 400 will also be contained in the first preview image 414 (see FIGS. 4A and 4B).

The program proceeds from step S12 or S14 to step S15 and then the preview image generating unit 212 modifies the first preview image 414 being displayed on the first display area 410, in accordance with operational instructions received in the preview display UI 400 (see step S11) or operational instructions generated by the preview operation converting unit 213 (see step S14) (step S15). For example, the preview image generating unit 212 switches physical pages contained in the first preview image 414 in accordance with operational instructions for page turning to the first preview image 414 (see FIGS. 4A and 4B).

The program proceeds from step S15 to step S16 and then the preview image generating unit 212 modifies the second preview image 424 being displayed in the second display area 420, in accordance with operational instructions received in the preview display UI 400 (see step S13) or operational instructions generated by the preview operation converting unit 213 (see step S12) (step S16). For example, the preview image generating unit 212 switches physical pages contained in the second preview image 424 in accordance with operational instructions for page turning to the second preview image 424 (see FIGS. 4A and 4B). It is preferable that step S15 and step S16 should be executed at the same time.

The program proceeds from step S16 to step S17 and then the preview image generating unit 212 further modifies the first preview image so that a logical page common to both the first and second preview images 414, 424 will be displayed in distinction from other logical pages (step S17). For example, the preview image generating unit 212 overlays a marker for differentiating the logical page common to both preview images on the first preview image 414 (see FIGS. 4A and 4B).

When the program proceeds from step S17 to step S18, the preview image generating unit 212 further modifies the second preview image so that a logical page common to both the first and second preview images 414, 424 will be displayed in distinction from other logical pages (step S18). For example, the preview image generating unit 212 overlays a marker for differentiating the logical page common to both preview images on the second previous image 424 (see FIGS. 4A and 4B).

Next, specific examples of the preview image displayed by the preview display control processing according to the present embodiment will be described below with reference to FIG. 4A to FIG. 11B.

FIGS. 4A and 4B are schematic views illustrating one example of the combination of the first and second preview images 414, 424 displayed on the preview display UI 400. In the present example, a default print setting is selected as the first print setting, and 4-Up printing and stapling are selected as the second print setting.

FIG. 4A illustrates a state where the first preview image 414 on the left side has not receive operational instructions, and FIG. 4B illustrates a state where the first preview image 414 has already received operational instructions. The operational instructions in the present example are intended to move forward the physical page contained in the first preview image 414 by one page.

As illustrated in FIG. 4B, when the operational instructions to the first preview image 414 is received, the first preview image 414 is modified in response, and then the second preview image 424 is modified in accordance with the first preview image 414 after being modified. More specifically, when the physical page of the first preview image 414 is moved forward by one page, the physical page of the second preview image 424 is moved forward by one page so that the logical page contained in the new physical page of the first preview image 414 will also be contained in the physical page of the second preview image 424 (see "09" page in FIG. 4B). In the present example, there is only one logical page contained in the new physical page of the first preview image 414, and hence the physical page of the second preview image 424 is moved forward by one page so that the only one logical page will also be contained in the physical page of the second preview image 424.

In other words, the present example ensures that the operational instructions to move forward the physical page of the first preview image 414 by one page will be converted to operational instructions to move forward the physical page of the second preview image 424 by one page. Thereby, both the first and second preview images 414, 424 contain the same logical page (see "09" page in FIG. 4B), and therefore the user can intuitively understand correspondence relationships between logical pages contained in respective preview images. Further, as illustrated in FIG. 4B, it is preferable to display the logical page commonly contained in both preview images after being modified in distinction from other logical page by means of a frame-shaped marker.

The present example assumes that the preview display UI 400 has received operational instructions to the first preview image 414, but it may also receive operational instructions to the second preview image 424. In the latter case, the preview operation converting unit 213 converts operational instructions to the second preview image 424 to operational instructions to the first preview image 414. The same is applied to the examples in FIGS. 5A to 11B.

Figure 5A:
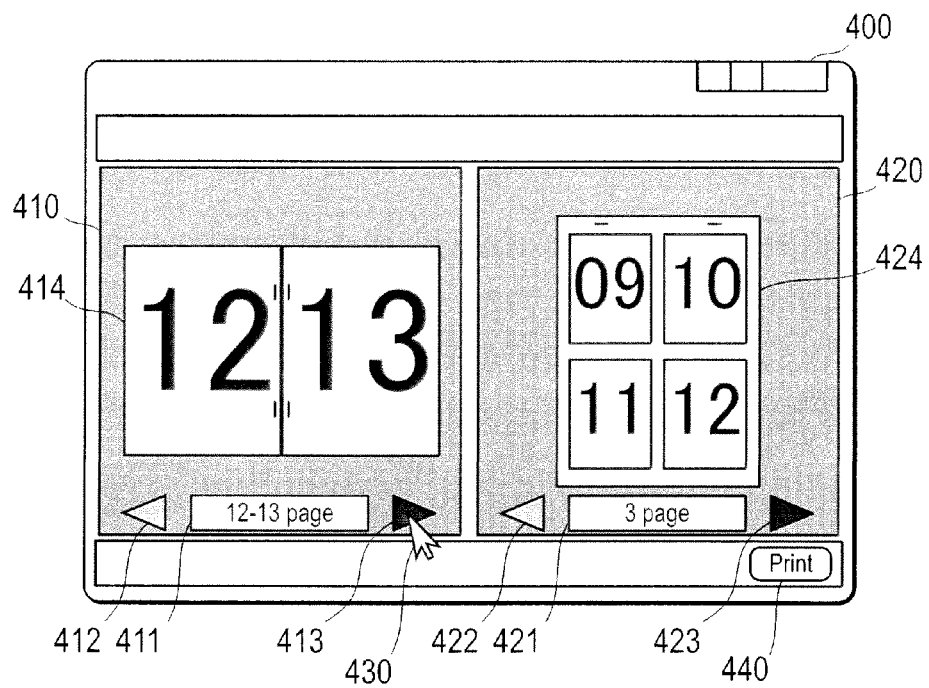
FIG. 5A is a schematic view illustrating another example of a first preview image and a second preview image according to an embodiment of the present invention.
Figure 5B:
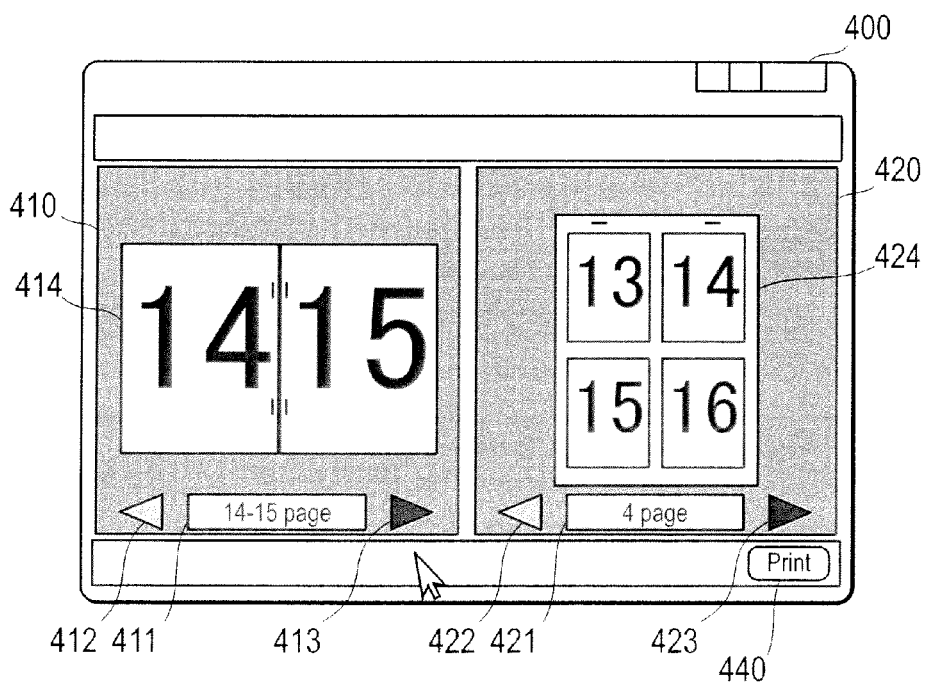
FIG. 5B is a schematic view illustrating another example of a first preview image and a second preview image according to an embodiment of the present invention.

FIG. 5A and FIG. 5B are schematic views illustrating another example of the combination of the first and second preview images 414, 424 displayed on the preview display UI 400. In the present example, double-sided printing and bookbinding (side stitching) are selected as the first print setting, and 4-Up printing and stapling are selected as the second print setting.

FIG. 5A illustrates a state where the first preview image 414 on the left side has not received operational instructions, and FIG. 5B illustrates a state where the first preview image 414 has already received operational instructions. The operational instructions in the present example are intended to move forward the physical page contained in the first preview image 414 by one page in the same way as the example in FIGS. 4A and 4B.

As illustrated in FIG. 5B, when the operational instructions to the first preview image 414 are received, the first preview image 414 is modified in response, and then the second preview image 424 is modified in accordance with the first preview image 414 after being modified. More specifically, when the physical page of the first preview page 414 is moved forward by one page, the physical page contained in the second preview image 424 is moved forward by one page so that the logical page contained in the new physical page of the first preview image 414 will also be contained in the physical page of the second preview image 424. In the present example, the physical page of the second preview image 424 is moved forward by one page so that the logical page with the smallest page number will also be contained in the second preview image 424 while there are two logical pages contained in the new physical pages of the first preview image 414.

In other words, the present example ensures that the operational instructions to move forward the physical page of the first preview image 414 by one page will be converted to operational instructions to move forward the physical page of the second preview image 424 by one page. Thereby, both the first and second preview images 414, 424 contain the same logical page (see "14" page in FIG. 5B), and therefore the user can intuitively understand the correspondence relationships between logical pages contained in the respective preview images.

Figure 6A:
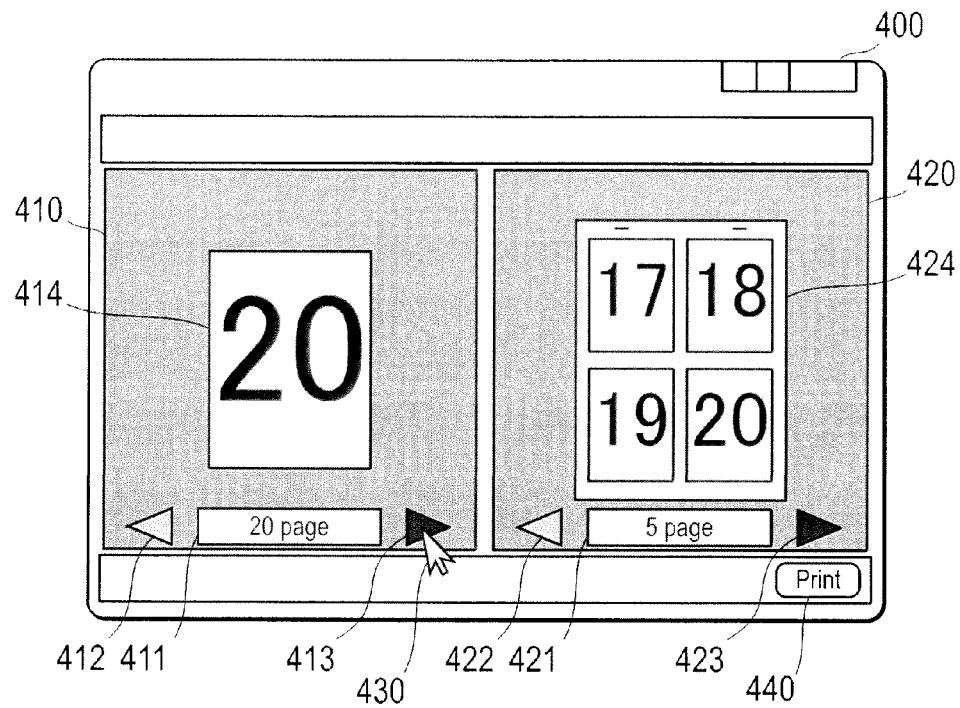
FIG. 6A is a schematic view illustrating another example of a first preview image and a second preview image according to an embodiment of the present invention.
Figure 6B:
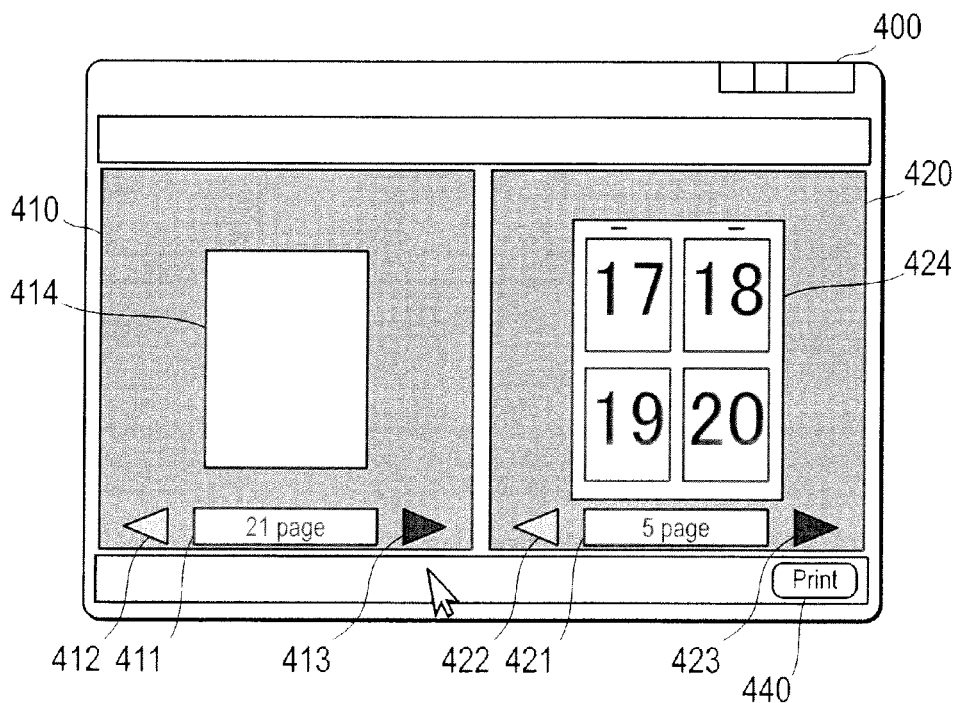
FIG. 6B is a schematic view illustrating another example of a first preview image and a second preview image according to an embodiment of the present invention.

FIG. 6A and FIG. 6B are schematic views illustrating another example of the combination of the first and second preview images 414, 424 displayed on the preview display UI 400. The present example assumes that a print setting to insert a blank sheet immediate after the 20$^{th}$ logical page is selected as the first print setting, and 4-Up printing and stapling are selected as the second print setting.

Herein, FIG. 6A illustrates a state where the first preview image 414 on the left side has not received operational instructions, and FIG. 6B illustrates the state where the first preview image 414 has already received operational instructions. The operational instructions in the present example are intended to move forward the physical page of the first preview image 414 by one page in the same way as the examples in FIGS. 4A, 4B, 5A and 5B.

As illustrated in FIG. 6B, when the operational instructions to the first preview image 414 are received, the first preview image 414 is modified in response, but the second preview image 424 will not be modified unlike the examples in FIGS. 4A, 4B, 5A and 5B. As illustrated in the present example where there is no logical page contained in the new physical page of the first preview image 414, the second preview image 24 will not be modified.

However, in the case where there is no logical page contained in the new physical page of the first preview image 414, the second preview image 424 may also be modified so that the logical page contained in a physical page adjacent to the new physical page will also be contained in the physical page of the second preview image 424. Further, in the case where the logical page contained in the new physical page of the first preview image 414 is already contained in the physical page of the second preview image 424, the second preview image 424 will not be modified in the same way as the example in FIGS. 6A and 6B.

Figure 7A:
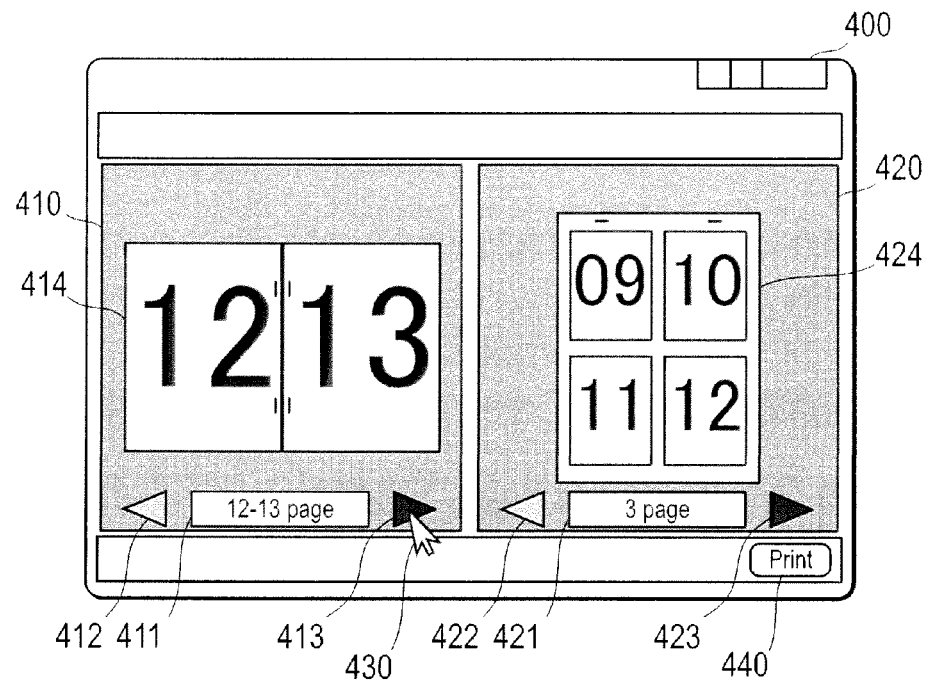
FIG. 7A is a schematic view illustrating another example of a first preview image and a second preview image according to an embodiment of the present invention.
Figure 7B:
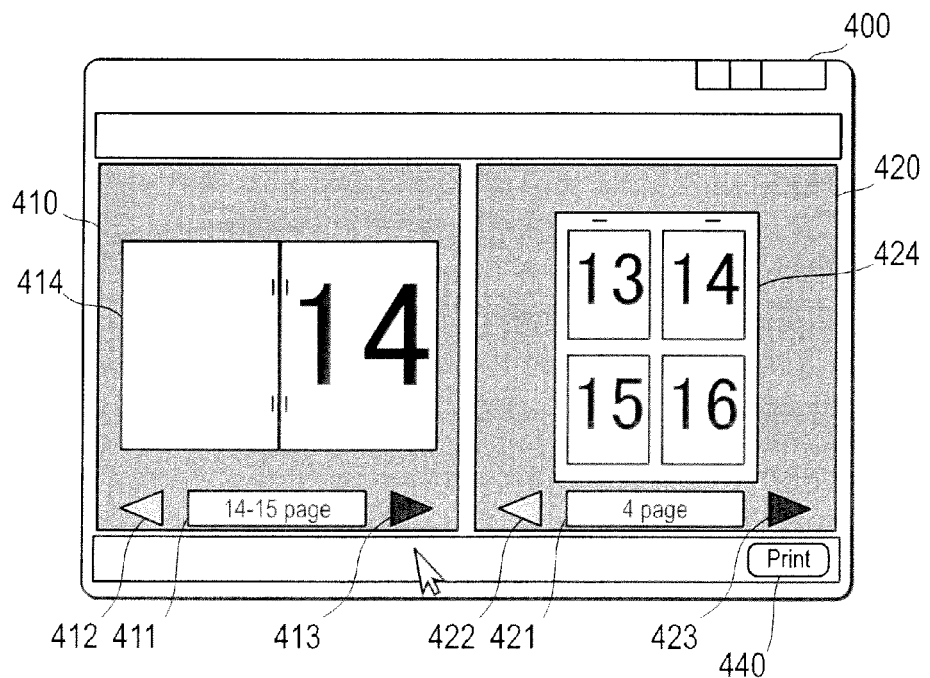
FIG. 7B is a schematic view illustrating another example of a first preview image and a second preview image according to an embodiment of the present invention.

FIG. 7A and FIG. 7B are schematic views illustrating another example of the combination of the first and second preview images 414, 424 displayed on the preview display UI 400. In the present example, double-sided printing, chapter division (chapter-dividing position: between the 13$^{th}$ logical page and the 14$^{th}$ logical page), and bookbinding (saddle stitching) are selected as the first print setting, and 4-Up printing and stapling are selected as the second print setting. When chapter division of document data has been selected, a blank sheet will be inserted between logical pages before and after a chapter-dividing position.

FIG. 7A illustrates a state where the first preview image 414 on the left side has not received operational instructions, and FIG. 7B illustrates a state where the first preview image 414 has already received operational instructions. The operational instructions in the present example are intended to move forward the physical page of the first preview image 414 one page in the same way as the examples in FIG. 4A to FIG. 6B.

As illustrated in FIG. 7B, when the operational instructions to the first preview image 414 are received, the first preview image 414 is modified in response, and then the second preview image 424 is modified in accordance with the first preview image 414 after being modified. More specifically, when the physical page of the first preview image 414 is moved forward by one page, the physical page of the second preview image 424 is moved forward so that the logical page contained in a new physical page of the first preview age 414 will also be contained in the physical page of the second preview image 424. In the present example where there is just one logical page contained in the new physical page of the first preview image 414 (see "14" page in FIG. 7B), and hence the physical page of the second preview image 424 is moved forward by one page so that the logical page is contained in the physical page of the second preview image 424.

In other words, the present example ensures that the operational instructions to move forward the physical page of the first preview image 414 by one page will be converted to operational instructions to move forward the physical page of the second preview image 424 by one page. Thereby, both the first and second preview images 414, 424 contain the same logical page (see "14" page in FIG. 7B), and therefore the user can intuitively understand correspondence relationships between logical pages contained in the respective preview images.

Figure 8:
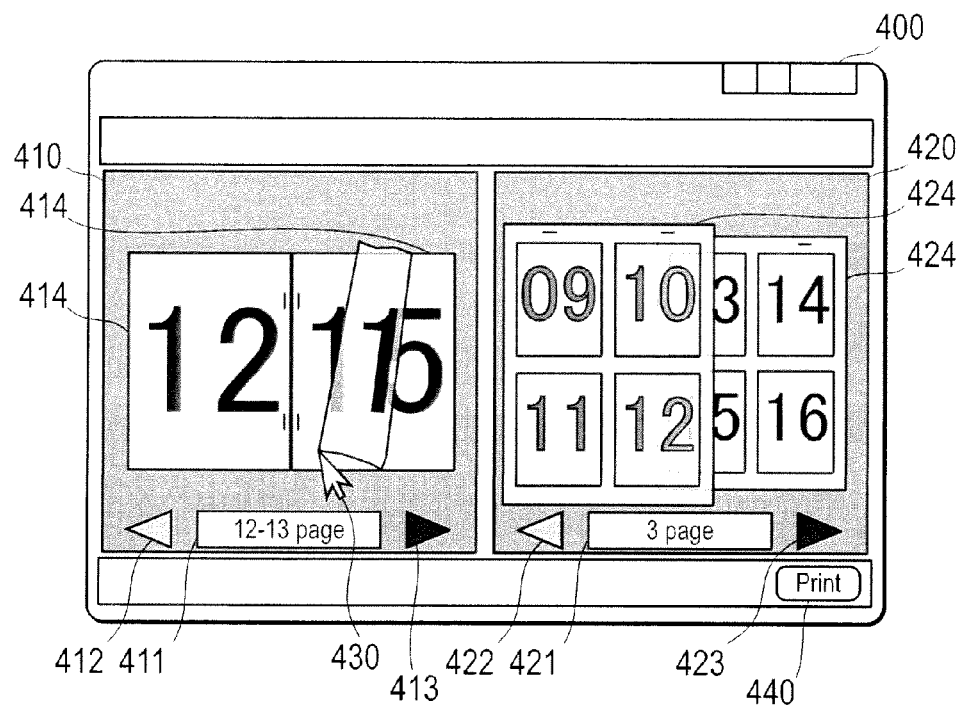
FIG. 8 is a schematic view illustrating another example of a first preview image and a second preview image according to an embodiment of the present invention.

FIG. 8 is a schematic view illustrating another example of the combination of the first and second preview images 414, 424 displayed on the preview display UI 400. In the present example, double-sided printing and bookbinding (side stitching) are selected as the first print setting, and 4-Up printing is selected as the second print setting. Further, the preview display UI 400 according to the present example has an interactive animation function, and hence it can dynamically modify both preview images in accordance with operational instructions to the first or second preview images 414, 424.

FIG. 8 illustrates a state where both preview images are dynamically modified in accordance with operational instructions to the first preview image 414 displayed on the left side in the screen. The operational instructions in the present example are intended to move forward the physical page of the first preview image 414 by one page, and such operational instructions are received when the user drags the physical page of the first preview image 414 using a mouse.

As illustrated in FIG. 8, when the operational instructions to the first preview image 414 are received, the first preview image 414 is modified in response, and then the second preview image 424 is modified in accordance with the first preview image 414 after being modified. More specifically, when a physical page of the first preview image 414 is laterally dragged, the physical page of the first preview image 414 is gradually flipped over in conjunction with the movement of the mouse pointer 430. And then the physical page of the second preview image 424 is gradually slid so that the logical page contained in the new physical page of the first preview image 414 will also be contained in the second preview image 424.

Figure 9:
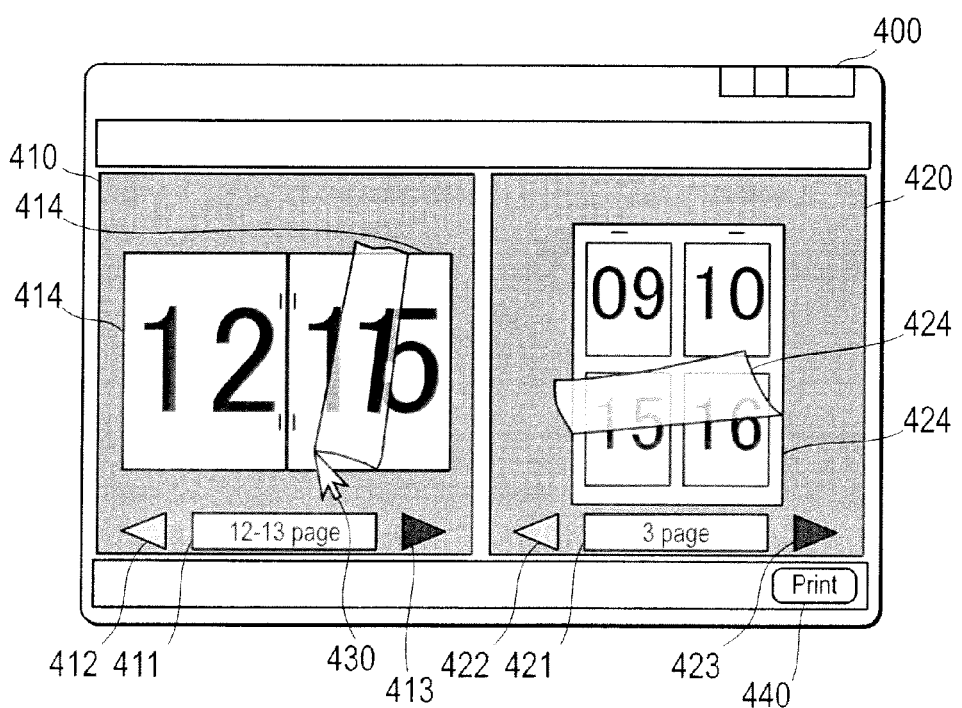
FIG. 9 is a schematic view illustrating another example of a first preview image and a second preview image according to an embodiment of the present invention.

FIG. 9 is a schematic view illustrating another example of the combination of the first and second preview images 414, 424 displayed on the preview display UI 400. In the present example, double-sided printing and bookbinding (side stitching) are selected as the first print setting, and 4-Up printing and stapling are selected as the second print setting. Further, the preview display UI 400 according to the present example has an interactive animation function in the same way as the example in FIG. 8.

FIG. 9 illustrates a state where both preview images are dynamically modified in accordance with operational instructions to the first preview image 414 displayed on the left side in the screen. The operational instructions in the present example are designed to move forward the physical page of the first preview image 414 by one page, in the same way as the example in FIG. 8, and such operational instructions are received when the user drags the physical page of the first preview image 414 using a mouse.

As illustrated in FIG. 9, when the operational instructions to the first preview image 414 are received, the first preview image 414 is modified in response, and then the second preview image 424 is modified in accordance with the first preview image 414 after being modified. More specifically, when the physical page of the first preview image 414 is laterally dragged, physical page of the first preview image 414 is gradually flipped over in conjunction with the movement of the mouse pointer 430. And then the physical page of the second preview image 424 is gradually flipped over so that the logical page contained in a new physical page of the first preview image 414 will also be contained in the second preview image 424.

As illustrated in FIG. 8 and FIG. 9, when both review images 414, 424 are dynamically modified using the animation function, it is preferable that an optimized modification method should be employed for each print setting. In other words, page turning of non-stapled printed matter usually involves a sliding movement of the physical page, and hence it is preferable that the modification method as illustrated in FIG. 8 should be employed when stapling is not selected as the second print setting. On the other hand, page turning of stapled printed matter usually involves a flipping movement of the physical page, and hence it is preferable that the modification method as illustrated in FIG. 9 should be employed when stapling is selected as the second print setting. As the optimized modification method is employed for the second print setting, the user can more precisely predict the finish of a printed matter resulting from the second print setting.

Figure 10A:
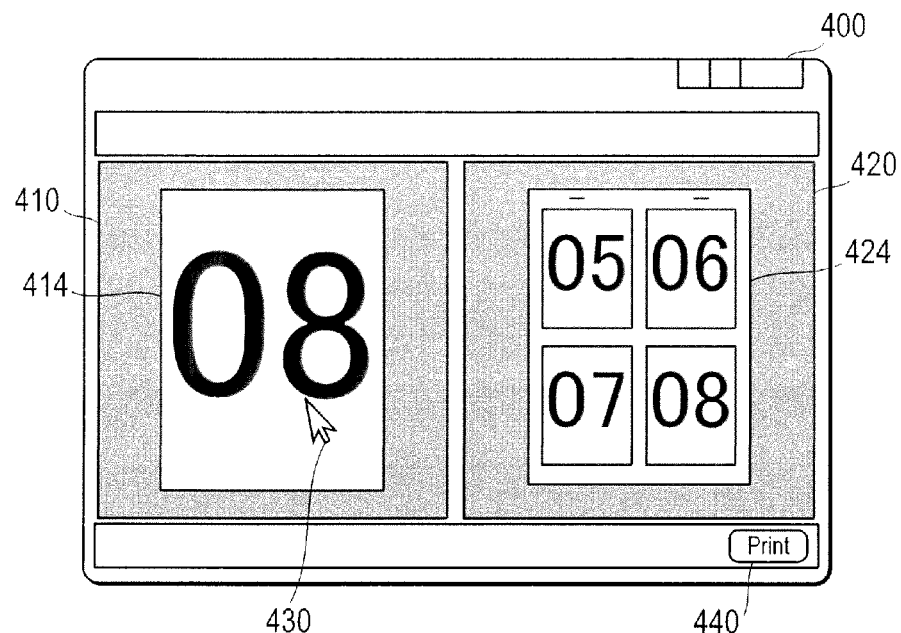
FIG. 10A is a schematic view illustrating another example of a first preview image and a second preview image according to an embodiment of the present invention.
Figure 10B:
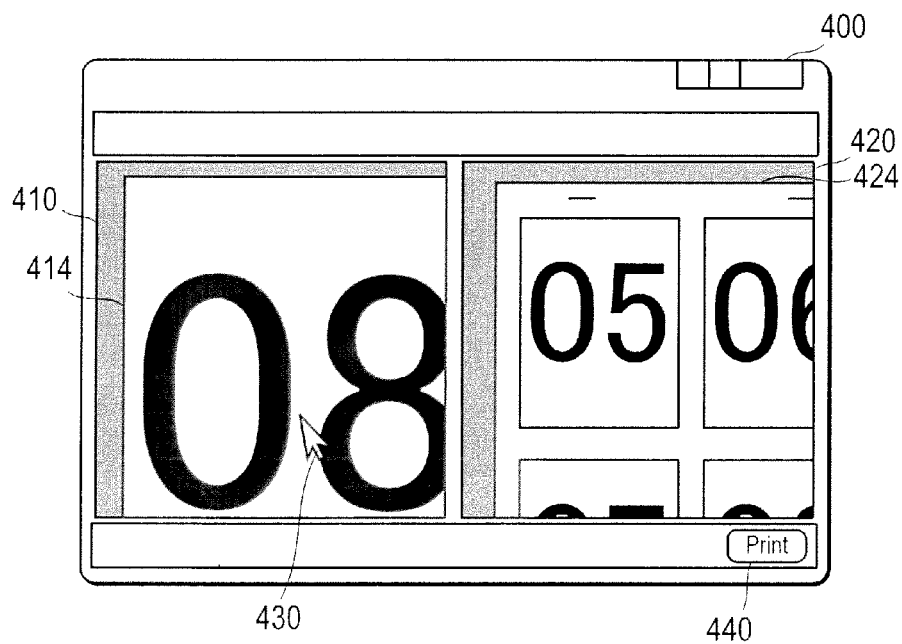
FIG. 10B is a schematic view illustrating another example of a first preview image and a second preview image according to an embodiment of the present invention.

FIG. 10A and FIG. 10B are schematic views illustrating another example of the combination of the first and second preview images 414, 424 displayed on the preview display UI 400. The present example assumes that a default print setting is selected as the first print setting, and 4-Up printing and stapling are selected as the second print setting.

FIG. 10A illustrates a state where the first preview image 414 on the left side has not received operational instructions, and FIG. 10B illustrates a state where the first preview image 414 has already received operational instructions. The operational instructions in the present example are designed to enlarge the upper left corner of the first preview age 414, and such operational instructions are received when the user clicks the first preview image 414 using a mouse.

As illustrated in FIG. 10B, when the operational instructions to the first preview image 414 are received, the first preview image 414 is modified in response, and then the second preview image 424 is modified in accordance with the first preview image 414 after being modified. More specifically, when the first preview image 414 has its upper left corner enlarged, the second preview image 424 also has its upper left corner enlarged at the same magnification.

In other words, the present example ensures that the operational instructions to enlarge the upper left corner of the first preview image 414 will be converted to operational instructions to enlarge the upper left corner of the second preview image 424. Thereby, the user can more precisely predict the finish of a specific portion (e.g. the upper left corner of the physical page) of a printed matter resulting from each of the first and second print settings.

Figure 11A:
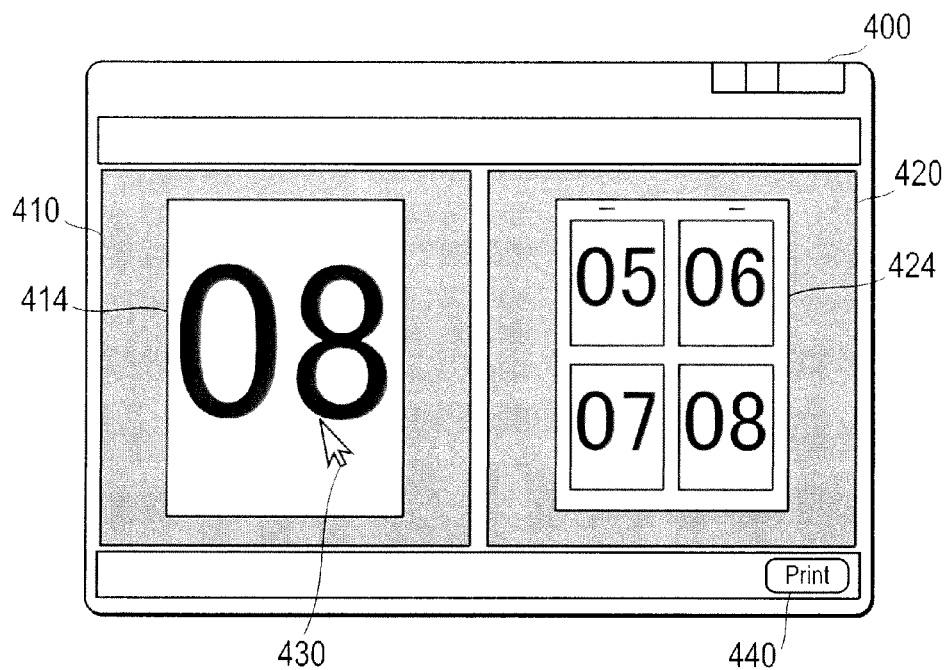
FIG. 11A is a schematic view illustrating another example of a first preview image and a second preview image according to an embodiment of the present invention.
Figure 11B:
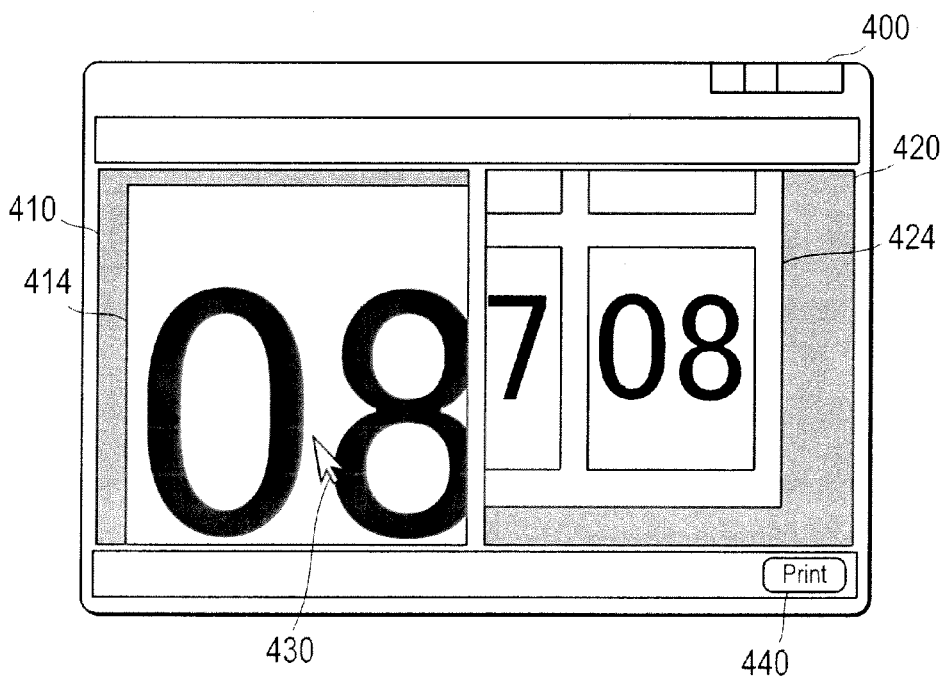
FIG. 11B is a schematic view illustrating another example of a first preview image and a second preview image according to an embodiment of the present invention.

FIG. 11A and FIG. 11B are schematic views illustrating another example of the combination of the first and second preview images 414, 424 displayed on the preview display UI 400. In the present example, a default print setting is selected as the first print setting, and 4-Up printing and stapling are selected as the second print setting.

FIG. 11A illustrates a state where the first preview image 414 on the left side has not received operational instructions, and FIG. 11B illustrates a state where the first preview image 414 has already received operational instructions. The operational instructions in the present example are intended to enlarge the upper left corner of the first preview image 414 in the same way as the example in FIGS. 10A and 10B, and such operational instructions are received when the user clicks the first preview image 414 using a mouse.

As illustrated in FIG. 11B, when the operational instructions to the first preview image 414 are received, the first preview image 414 is modified in response, and then the second preview image 424 is modified in accordance with the first preview image 414 after being modified. More specifically, when the first preview image 414 has its physical page enlarged in the upper left corner enlarged, the second preview image 424 has its physical page enlarged centrally in the logical page contained in the physical page of the first preview image 414 after being enlarged (see "08" page in FIG. 11B).

In other words, the present example ensures that the operational instructions to enlarge the upper left corner of the first preview image 414 will be converted to operational instructions to enlarge the second preview image 424 centrally in the logical page "08". Thereby, the user can more precisely predict the finish of a specific logical page (e.g. the 8$^{th}$ logical page) in a printed matter resulting from each of the first and second print settings.

As described above, when various operational instructions (such as page turning, enlargement/reduction, and rotation) to the first preview image 414 are received in the preview display UI 400, the client terminal apparatus 200 in the present embodiment modifies the first preview image 414 in accordance with the operational instructions, and then modifies the second preview image 424 in accordance with the first preview image 414 after being modified. Therefore, the client terminal apparatus 200 in the present embodiment ensures that the user can intuitively understand correspondence relationships between logical pages contained in the respective preview images and hence predict the finish of a printed matter in a precise way.

The present invention is not limited to the aforementioned embodiments and it can also be modified in various manners within the scope of the appended claims. For example, although the above-described embodiment employs the client terminal apparatus 200 as the print setting apparatus, but the print setting apparatus according to the present invention may also take the form of an optional function installed in a printing apparatus. Further, the printing apparatus according to the present invention may be a multi-function peripheral (MFP) provided with scanning, printing, and copying functions. Still further, while the above-described embodiment assumes that two preview images are displayed based on two print setting suites, the print setting apparatus according to the present invention is also capable of displaying more than two preview images based on more than two print setting suites.

The means and methods for performing various processes in the print setting apparatus according to the present embodiment may be implemented by a dedicated hardware circuit or a programmed computer. The abovementioned program can be provided either in the form of a computer readable storage medium such as a flexible disk and a CD-ROM, or an online downloadable file via a network such as Internet. In the former case, the program recorded in the computer readable recording medium is normally transmitted to a memory unit such as a hard disk. The abovementioned program can also take the form of an independent application software or a built-in function of the print setting apparatus.

What is claimed is:
1. A print setting apparatus comprising:
a display unit for displaying a first preview image and a second preview image each showing output results of print data obtained by a first print setting and a second print setting;
an operating unit for receiving operational instructions to said first preview image displayed by said display unit;
a converting unit for converting operational instructions to said first preview image received by said operating unit in accordance with a predetermined rule; and a modifying unit for modifying said first preview image displayed by said display unit in accordance with operational instructions received by said operating unit, and modifying said second preview image displayed by said display unit based on said operational instructions converted by said converting unit.

2. The print setting apparatus as claimed in claim 1, wherein the print setting apparatus is part of a printing apparatus, and said printing apparatus comprises a printing unit for printing an image based on said print data in accordance with said first print setting or said second print setting.

3. The print setting apparatus as claimed in claim 1, wherein
said modifying unit modifies said second preview image so that a logical page of said print data contained in said first preview image after being modified will also be contained in said second preview image.

4. The print setting apparatus as claimed in claim 3, wherein
said modifying unit modifies said second preview image when a plurality of logical pages of said print data are contained in said first preview image after being modified, so that at least one logical page with smallest page number among said plurality of logical pages will also be contained in said second preview image.

5. The print setting apparatus as claimed in claim 3, wherein
any logical page of said print data contained in both said first preview image after being modified by said modifying unit and said second preview image after being modified by said modifying unit is displayed in distinction from other logical pages.

6. The print setting apparatus as claimed in claim 1, wherein
said modifying unit dynamically modifies said first preview image and said second preview image in accordance with operational instructions received by said operating unit.

7. The print setting apparatus as claimed in claim 1, wherein
operational instructions received by said operating unit are instructions regarding page turning, enlargement or reduction, or rotation of said first preview image.

8. The print setting apparatus as claimed in claim 1, wherein
at least one of said first print setting and said second print setting includes at least one of N-Up printing, double-sided printing, bookbinding, stapling, punching, and chapter division.

9. A control method of a print setting apparatus, comprising steps of:
(A) displaying a first preview image and a second preview image each showing output results of print data obtained by a first print setting and a second print setting;
(B) receiving operational instructions to said first preview image displayed in said step (A);
(C) converting operational instructions to said first preview image received in said step (B) in accordance with a predetermined rule; and
(D) modifying said first preview image displayed in said step (A) in accordance with operational instructions received in said step (B), and modifying said second preview image displayed in said step (A) based on said operational instructions converted in said step (C).

10. A non-transitory computer readable storage medium storing a control program of a print setting apparatus, said control program causing said print setting apparatus to execute steps of:
(A) displaying a first preview image and a second preview image each showing output results of print data obtained by a first print setting and a second print setting;
(B) receiving operational instructions to said first preview image displayed in said step (A);
(C) converting operational instructions to said first preview image received in said step (B) in accordance with a predetermined rule; and
(D) modifying said first preview image displayed in said step (A) in accordance with operational instructions received in said step (B), and modifying said second preview image displayed in said step (A) based on said operational instructions converted in said step (C).

11. The non-transitory computer readable recording medium as claimed in claim 10, wherein
in said step (D), said second preview image is modified so that a logical page of said print data contained in said first preview image after being modified will also be contained in said second preview image.

12. The non-transitory computer readable recording medium as claimed in claim 11, wherein
at least one of said first print setting and said second print setting includes at least one of N-Up printing, double-sided printing, bookbinding, stapling, punching, and chapter division.

13. The non-transitory computer readable recording medium as claimed in claim 11, wherein
in said step (D), said second preview image is modified when a plurality of logical pages of said print data are contained in said first preview image after being modified, so that at least one logical page with smallest page number among said plurality of logical pages will also be contained in said second preview image.

14. The non-transitory computer readable recording medium as claimed in claim 11, wherein
in said step (D), any logical page of said print data contained in both said first preview image after being modified and said second preview image after being modified is displayed in distinction from other logical pages.

15. The non-transitory computer readable recording medium as claimed in claim 11, wherein
in said step (D), said first preview image and said second preview image are dynamically modified in accordance with operational instructions received in said step (A).

16. The non-transitory computer readable recording medium as claimed in claim 11, wherein
operational instructions received in said step (A) are instructions regarding page turning, enlargement or reduction, or rotation of said first preview image.

17. A non-transitory computer readable recording medium storing a control program of a print setting apparatus, said control program causing said print setting apparatus to execute steps of:
(A) displaying a first preview image and a second preview image each showing output results of print data obtained by a first print setting and a second print setting;
(B) receiving operational instructions to said first preview image displayed in said step (A); and
(C) modifying said first preview image displayed in said step (A) in accordance with operational instructions received in said step (B), and modifying said second preview image displayed in said step (A) so that a logical page of said print data contained in said first preview image after being modified will also be contained in said second preview image.

18. The non-transitory computer readable recording medium as claimed in claim 17, wherein
at least one of said first print setting and said second print setting includes at least one of N-Up printing, double-sided printing, bookbinding, stapling, punching, and chapter division.

19. The non-transitory computer readable recording medium as claimed in claim 17, wherein
in said step (C), said second preview image is modified when a plurality of logical pages of said print data are contained in said first preview image after being modified, so that at least one logical page with smallest page number among said plurality of logical pages will also be contained in said second preview image.

20. The non-transitory computer readable recording medium as claimed in claim 17, wherein
in said step (C), any logical page of said print data contained in both said first preview image after being modified and said second preview image after being modified is displayed in distinction from other logical pages.

21. The non-transitory computer readable recording medium as claimed in claim 17, wherein
in said step (C), said first preview image and said second preview image are dynamically modified in accordance with operational instructions received in said step (A).

22. The non-transitory computer readable recording medium as claimed in claim 17, wherein
operational instructions received in said step (A) are instructions regarding page turning, enlargement or reduction, or rotation of said first preview image.

23. A print setting apparatus comprising:
a display unit for displaying a first preview image and a second preview image each showing output results of print data obtained by a first print setting and a second print setting;
an operating unit for receiving operational instructions to said first preview image displayed by said display unit;
a converting unit for converting operational instructions to said first preview image received by said operating unit in accordance with a predetermined rule; and
a modifying unit for modifying said first preview image displayed by said display unit in accordance with operational instructions received by said operating unit, and modifying said second preview image displayed by said display unit so that a logical page of said print data contained in said first preview image after being modified will also be contained in said second preview image.

24. The print setting apparatus as claimed in claim 23, wherein the print setting apparatus is part of a printing apparatus, and said printing apparatus comprises a printing unit for printing an image based on said print data in accordance with said first print setting or said second print setting.

25. The print setting apparatus as claimed in claim 23, wherein
said converting unit converts operational instructions to said first preview image received by said operating unit in accordance with the predetermined rule, in order to generate operational instructions to said second preview image, wherein
said modifying unit modifies said second preview image in accordance with operational instructions to said second preview image generated by said converting unit.

* * * * *